United States Patent

[11] 3,617,303

[72] Inventor Gerardus A. Geurts
 Geleen, Netherlands
[21] Appl. No. 781,988
[22] Filed Dec. 6, 1968
[45] Patented Nov. 2, 1971
[73] Assignee Stamicarbon N. V. Heelen
 Netherlands
[32] Priority Dec. 7, 1967
[33] Netherlands
[31] 6716679

[54] PROCESS FOR INCREASING THE AMINO-ACID CONTENT IN CEREALS
 5 Claims, No Drawings
[52] U.S. Cl..................................................... 99/83,
 99/80 PS
[51] Int. Cl...................................................... A23l 1/30
[50] Field of Search.......................................... 99/83, 80
 R, 11, 80 PS

[56] References Cited
UNITED STATES PATENTS
3,157,514 11/1964 Gorozpe....................... 99/80
OTHER REFERENCES
Matz, Samuel A., " The chemistry and Technology of Cereals as Food and Feed," Westport, Conn. 1959, page 631. TX 545M36

Primary Examiner—Lionel M. Shapiro
Assistant Examiner—James R. Hoffman
Attorney—Cushman, Darby & Cushman ABSTRACT: There is provided an improvement in the process for increasing the amino acid content of cereals by contacting with an aqueous solution of at least one amino acid to cause absorption of the amino acid into the cereal. The improvement resides in first increasing the water content of the cereal prior to contacting the cereal with the solution of at least one amino acid, whereby an increased absorption of the amino acid is obtained.

3,617,303

PROCESS FOR INCREASING THE AMINO-ACID CONTENT IN CEREALS

Detailed description of the invention

This invention relates to an improvement in a process for increasing the amino-acid content of cereals, wherein a cereal is contacted with an aqueous solution containing one or more amino acids for a period of time sufficient that the amino acid is absorbed by the cereal. This application, being assigned to the same assignees as the present application, reference.

According to the process described in that application, the amino-acid content of cereals may be increased with substantial preservation of the granular character of the cereal. According to that invention, a cereal is contacted with an aqueous solution of at least one amino acid, e.g. a 3 to 40 percent by weight solution, for a period of time sufficient to cause the amino acid to be absorbed by the cereal and substantially increase the amino-acid content thereof. Typically, the contact time is between 15 and 45 minutes at 40° to 85° C. with a resulting amino-acid content of the cereal between about 600 percent and 3300 percent of the natural amino-acid content.

Such a process is, of course, quite important for increasing the nutritional value of cereals and represents a very efficient way of "enriching" products which are normally relatively low in amino acids, e.g. bread and cakes. However, it would be most desirable to further increase the amino-acid content of cereals, especially where high amino-acid contents are important in special dietary problems. Further, where a cereal with a high amino-acid content can be obtained, these cereals may be blended in relatively small proportions with untreated natural cereals to provide any desired final amino-acid content without the necessity of treating all or substantially all of the cereal in order to obtain a relatively high average amino-acid content.

Accordingly, it is an object of the present invention to provide an improved process for increasing the amino-acid content of cereals wherein exceptionally high amino-acid contents may be obtained. It is a further object to provide cereals with heretofore unobtainable amino-acid contents. Other objects will be apparent from the following disclosure and claims.

Briefly stated, it has now been found that in the treatment of a cereal with an aqueous solution of at least one amino acid, a considerably higher amino-acid content may be obtained, with preservation of the granular character of the cereal, by contacting the cereal with water for a period of time sufficient to increase the water content of the cereal and thereafter contacting the cereal having an increased water content with the solution of at least one amino acid.

For purposes of the present specification and claims, the term "amino acid" is intended to embrace the so-called essential amino acids and the derivatives thereof (see Condensed Chemical Dictionary, 6th Ed.) of which lysine, methionine and threonine are examples. Often convenient use is made of the derivatives of the amino acids and these known derivatives are also intended to be embraced by the mentioned terms.

Similarly, the term cereal is intended to embrace the group of natural grains used for human and animal consumption and include wheat, rice, rye and maize. Accordingly, it should be understood that the particular amino acid and cereal is not critical to the present process.

The increase of the water content of the cereal is not altogether critical, but in order to effect a substantial increase in the amount of amino acid absorbed, the increase in water content, expressed as weight percent increase over the weight of the natural cereal, should be at least 3 percent, preferably at least 4 percent and especially at least 10 percent. The increase in water content of the cereal is important, since the amount of amino acid absorbed by the cereal is dependent thereon, as well as upon the cereal.

For example, in the treatment of wheat with an aqueous solution containing L-lysine monohydrochloride, the L-lysine monohydrochloride content in the wheat may be increased to about 8 percent by weight, if the wheat contains an additional 30 percent by weight of water (calculated with respect to the weight of wheat containing its natural water content).

As a further feature of the invention, it has been found that the amount of amino acid absorbed can be further increased if the cereal which has an increased water content is broken (as hereinafter defined) before being treated with the solution of an amino acid. For example, if the same wheat mentioned above (natural water content of about 14 percent is increased in water content by 30 percent with respect to the weight of the wheat and the wheat grains are then broken, the treatment with an aqueous solution of L-lysine monohydrochloride, will produce a L-lysine monohydrochloride content of the wheat of about 12 percent by weight, as opposed to the 8 percent by weight of the wheat treated with unbroken grains. Preferably, the cereal is firs increased in water content and subsequently broken, because this facilitates the breaking procedure, but the reverse of the steps may be practiced.

The terms broken grains are defined as grains which have had the husks thereof cracked, but with substantial preservation of the granular character of the cereal. The husk may be broken by means known to the art such as subjecting the grains to a light pressure, e.g. between two rubber-lined rollers rotating in opposite directions, between rotating discs, by fluid blasts and by vigorous tumbling.

The present improvement is, indeed, quite surprising, since from a theoretical point of view, it would be assumed that an increased water content of the cereal to be treated with the amino-acid solution would have an adverse effect or at least no effect at all on the amount of amino acids absorbed by the cereal. The present improved result is especially surprising in view of the fact that the process of the aforementioned application provides an excess of water during the treatment with the amino-acid solution.

In this latter regard, even if cereal with the natural water content is subjected to a prolonged treatment, e.g. 10 hours or more, as described in the aforementioned application, the amount of amino acids absorbed by the cereal will be much smaller than that absorbed by the cereal with an increased water content in a much shorter time, as taught by the present invention.

The present improved process has an important advantage in that it permits the treating a smaller portion of a cereal with the aqueous solution containing one or more amino acids in order to obtain the desired average amino-acid content in the total amount of the cereal upon mixing of the treated portion with an untreated portion. It further allows the production of cereals with heretofore unobtainably high amino acid contents.

Generally speaking, a sufficient increase in water content of the cereal to be treated according to the invention may be obtained by contacting, e.g. soaking, spraying, dipping, etc., the water with the cereal for a relatively short time such as from ¼ to 6 hours, e.g. for 1–4 hours.

While the temperature of the water for increasing the water content of the cereal is not critical, elevated temperatures are preferred since the absorption of water by the cereal takes place more rapidly at higher temperatures. The water temperature is therefore suitably up to the boiling point of water, e.g. between 40° and 70° C. However, if desired, the cereal may also be contacted with steam (preferably low pressure, e.g. up to 20 p.s.i.g., saturated steam) instead of with water Since as noted above, a higher amino-acid content of the cereal can be obtained with increasing amount of water which has been absorbed by the cereal, by controlling the amount of water absorbed by the cereal, i.e. controlling the time and temperature of the water contacting step, the amount of amino acid absorbed may also be controlled.

However, valuable results may be obtained over a relatively wide range of percent increases in water content of the cereal over cereal with the water content of the natural cereal, e.g. from about 3 percent to 55 percent, especially 4 percent to 45 percent. Of course, the particular amount of water absorbed will depend upon the particular cereal being treated. For example, the water content of wheat is preferably increased by an amount corresponding to a 4–30 percent by weight increase of water content with respect to the wheat with a natural water content. In the case of maize, the percentage increase in water content preferably varies from 10 to 45 percent by weight.

Of course, after the cereal of increased water content is treated with the aqueous solution of one or more amino acids, the cereal may be dried, e.g. at up to 85° C., especially between 40 and 70° C., to reduce the moisture content to any desired level, e.g. the natural level.

The improved process according to the invention will be further illustrated by the following examples, but it is to be understood that the invention is not limited to the examples, but is fully applicable to the foregoing disclosure.

Example 1

100 g. of wheat grains (natural water content 14 percent by weight; L-lysine content 0.2 percent by weight) were contacted by soaking with 200 g. of water at 60° C. for 3½ hours. The grains absorbed 30 g. of water during that period (the increased water content percentage of the soaked wheat with respect to the wheat with a natural water content amounts to 30 percent by weight). The grains were separated off by filtration and subsequently contacted with an aqueous solution containing 30 percent by weight of L-lysine monohydrochloride at 60° C. for 4 hours.

The grains were filtered off, washed with flowing water, and dried in an oven at 60° C. to a water content of 15 percent by weight. The L-lysine monohydrochloride content of the dried wheat grains was determined to be 8 percent by weight. As a comparison, wheat grains (natural water content of 14 percent by weight) were treated in the same manner as above but without the water soaking step. The L-lysine monohydrochloride content of the dried wheat grains was determined to be only 3.8 percent by weight.

Example 2

100 g. of wheat grains were contacted by soaking with 220 g. of water at 60° C. for 3 hours. The water which had not been absorbed was removed by filtration, after which the grains were broken by passing the wheat grains between two rubber-lined rollers rotating in opposite directions (shortest distance between the rollers: 2 millimeters; diameter of the rollers: 8 centimeters). The amount of water absorbed by the grains amounted to 28 g.

Subsequently, the broken grains were contacted by soaking with an aqueous solution containing 25 percent by weight of L-lysine monohydrochloride at 55° C. for 3½ hours.

The grains were filtered off, washed with flowing water, and dried at 55° C. in an oven. The dried wheat grains contain 11.8 percent by weight of L-lysine monohydrochloride and 14 percent by weight of water.

Example 3

100 g. of maize grains (natural water content 12.5 percent by weight; L-lysine content 0.3 percent by weight), were contacted by soaking with 195 g. of water at 55° C. for 3½ hours. The maize grains, which have absorbed 40 g. of water in the treatment, were separated off by filtration and subsequently treated with an aqueous solution containing 30 percent by weight of L-lysine monohydrochloride at 60° C. for 3 hours. Thereafter, the grains were filtered off, washed with flowing water, and dried at 60° C. in an oven. The L-lysine monohydrochloride content of the dried maize grains was 9.5 percent by weight, while the water content was 13 percent by weight.

As can be seen from the above examples, cereals with exceptional high increases in the amino-acid content may be obtained. For example a content of lysine (which is an essential amino acid) of over 1100 percent of the original lysine content may be obtained in the treating of unbroken cereals. In the treating of broken cereals a lysine content may be obtained which amounts to over 3400 percent of the original lysine content. Heretofore such increases in amino-acid contents were not obtainable.

What is claimed:

1. A process for increasing the amino acid content of cereals consisting essentially of
   a. contacting cereal grain with water at a temperature of from about 40° C. to about 70° C. for a period of time sufficient to increase the water content of the cereal by 4 to 55 percent by weight of the cereal,
   b. transferring said cereal grain, containing said increased water content, to an aqueous solution of at least one amino acid having a temperature between about 40° C. and about 85° C. and
   c. contacting said cereal with said aqueous amino-acid solution for a sufficient time to absorb a substantial amount of the amino acid.

2. Process according to claim number 1 in which the grains of the cereal are broken.

3. Process according to claim 2, in which the cereal is contacted with water to increase the water content thereof prior to breaking the grains of the cereal.

4. A process according to claim 1, in which the cereal is wheat and the water content of the wheat is increased by 4 to 30 percent by weight of the wheat.

5. A process according to claim 1 in which the cereal is maize and the water content of the maize is increased by 10 to 45 percent by weight of the maize.

* * * * *